US011015690B2

(12) United States Patent
Ling et al.

(10) Patent No.: US 11,015,690 B2
(45) Date of Patent: May 25, 2021

(54) DIFFERENTIAL MECHANISM, AND VEHICLE

(71) Applicant: BYD COMPANY LIMITED, Guangdong (CN)

(72) Inventors: Heping Ling, Shenzhen (CN); Zhen Zhai, Shenzhen (CN); Youbin Xu, Shenzhen (CN); Changan Huang, Shenzhen (CN)

(73) Assignee: BYD COMPANY LIMITED, Guangdon (CN)

( * ) Notice: Subject to any disclaimer, the term of this patent is extended or adjusted under 35 U.S.C. 154(b) by 63 days.

(21) Appl. No.: 16/474,254

(22) PCT Filed: Dec. 15, 2017

(86) PCT No.: PCT/CN2017/116618
§ 371 (c)(1),
(2) Date: Jun. 27, 2019

(87) PCT Pub. No.: WO2018/121298
PCT Pub. Date: Jul. 5, 2018

(65) Prior Publication Data
US 2020/0124154 A1 Apr. 23, 2020

(30) Foreign Application Priority Data

Dec. 27, 2016 (CN) .......................... 201611226769.0

(51) Int. Cl.
*F16H 48/32* (2012.01)
*F16H 48/08* (2006.01)
(Continued)

(52) U.S. Cl.
CPC ............. *F16H 48/32* (2013.01); *F16H 48/08* (2013.01); *F16H 48/22* (2013.01); *F16H 48/38* (2013.01)

(58) Field of Classification Search
CPC .......... F16H 48/08; F16H 48/22; F16H 48/32; F16H 48/38
(Continued)

(56) References Cited

U.S. PATENT DOCUMENTS 4,263,824 A * 4/1981 Mueller ................. B60T 8/171
475/86
4,895,236 A 1/1990 Sakakibara et al.
(Continued)

FOREIGN PATENT DOCUMENTS

| CN | 1661263 A | 8/2005 |
|---|---|---|
| CN | 2906215 Y | 5/2007 |

(Continued)

OTHER PUBLICATIONS

International Search Report and Written Opinion for PCT Application No. PCT/CN2017/116618, dated Mar. 14, 2018, 9 pages.

Primary Examiner — Leslie A Nicholson, III

(57) ABSTRACT

The present specification discloses a differential mechanism and a vehicle. The differential mechanism includes a shell. A left half axle gear, a right half axle gear, a planet wheel and a planet wheel axle are disposed in the shell. The planet wheel is rotatably mounted on the planet wheel axle and meshes with the left half axle gear and the right half axle gear. A power engagement device includes a first engagement portion and a second engagement portion. The first engagement portion is connected with the left half axle gear or the right half axle gear, and the second engagement portion rotates synchronously with and moves axially relative to the shell. An engagement portion drive device includes a drive pin and a drive portion. The drive portion is configured to drive the drive pin to drive the second engagement portion close to the first engagement portion along an axial direction.

15 Claims, 3 Drawing Sheets

(51) Int. Cl.
*F16H 48/22* (2006.01)
*F16H 48/38* (2012.01)

(58) Field of Classification Search
USPC .......................................................... 475/230
See application file for complete search history.

(56) References Cited

U.S. PATENT DOCUMENTS

| | | | |
|---|---|---|---|
| 4,950,214 A | 8/1990 | Botterill | |
| 6,561,939 B1 | 5/2003 | Knape | |
| 6,698,565 B2* | 3/2004 | Cool | F16H 48/08 180/248 |
| 6,745,879 B1* | 6/2004 | Dolan | F16D 27/112 180/247 |
| 6,808,037 B1* | 10/2004 | Mueller | B60K 17/16 180/247 |
| 6,953,411 B2* | 10/2005 | Burns | B01D 29/055 192/103 F |
| 7,033,300 B2* | 4/2006 | Mueller | B60K 17/3467 475/204 |
| 9,657,827 B2* | 5/2017 | Gopal | F16H 48/24 |
| 2005/0187063 A1 | 8/2005 | Haruki | |
| 2015/0107933 A1 | 4/2015 | Gopal et al. | |
| 2015/0165901 A1 | 6/2015 | Tamoto et al. | |

FOREIGN PATENT DOCUMENTS

| | | |
|---|---|---|
| CN | 103244636 A | 8/2013 |
| CN | 203730692 U | 7/2014 |
| CN | 104154207 A | 11/2014 |
| CN | 203979323 U | 12/2014 |
| CN | 204755825 U | 11/2015 |

* cited by examiner

DIFFERENTIAL MECHANISM, AND VEHICLE

CROSS-REFERENCE TO RELATED APPLICATIONS

This application is a national phase application of International Application No. PCT/CN2017/116618, filed on Dec. 15, 2017, which is based on and claims priority to and benefits of Chinese Patent Application No. 201611226769.0, filed with the State Intellectual Property Office of People's Republic of China on Dec. 27, 2016. The entire content of all of the above-referenced applications is incorporated herein by reference.

FIELD

The present specification relates to a technical field of vehicles, and more particularly relates to a differential mechanism and a vehicle having the differential mechanism.

BACKGROUND

In related art, an electric locking differential mechanism has a complicated structure with many parts and occupies a large space, resulting in high cost, difficult control, and cumbersome implementation. In addition, a large quantity of parts also increases assembling difficulty, results in lower assembling efficiency, and also reduces space utilization of a vehicle.

SUMMARY

An objective of the present specification is to resolve the technical problems in the related art. Thus, the present specification provides a differential mechanism that has a simple structure and reliable implementation to improve the mobility of a vehicle.

The present specification further provides a vehicle.

The differential mechanism according to the present specification includes: a shell, where a left half axle gear, a right half axle gear, a planet wheel, and a planet wheel axle are disposed in the shell. The planet wheel is rotatably mounted on the planet wheel axle, and the planet wheel meshes with the left half axle gear and the right half axle gear. A power engagement device includes a first engagement portion and a second engagement portion. The first engagement portion is connected with the left half axle gear or the right half axle gear, and the second engagement portion rotates synchronously with the shell and moves axially with respect to the shell. An engagement portion drive device includes a drive pin and a drive portion. The drive pin is configured to rotate with the shell and to move axially with respect to the shell. Two ends of the drive pin are respectively matched with the drive portion and the second engagement portion. The drive portion is configured to drive the drive pin to drive the second engagement portion towards the first engagement portion along an axial direction to engage the second engagement portion with the first engagement portion.

In the differential mechanism according to the present specification, the drive portion may drive the second engagement portion to be engaged with the first engagement portion by driving the drive pin to move axially to lock the shell with the corresponding half axle gears. As a result, two half axles are locked together to improve the mobility of the vehicle. Furthermore, locking the left half axle and the right half axle may be realized by the power engagement device and the engagement portion drive device, so that the differential mechanism has a simple structure, resulting in a reliable implementation, fewer parts, a small size, and a low cost.

In addition, the differential mechanism according to the present specification may also have the following distinguishing technical features.

In some embodiments of the present specification, a drive axle sliding chute is formed in the shell, and the drive pin is slidably disposed in the drive axle sliding chute.

In some embodiments of the present specification, a shell axial slot is also formed in the shell. A second engagement portion protrusion is disposed on the second engagement portion to cause the second engagement portion to rotate with the shell and to move axially with respect to the shell.

In some embodiments of the present specification, the differential mechanism may also include an elastic device. The elastic device elastically presses against the second engagement portion to cause the second engagement portion moving away from the first engagement portion.

In some embodiments of the present specification, one end of the elastic device elastically presses against the second engagement portion, and the other end of the elastic device elastically presses against the shell.

In some embodiments of the present specification, the elastic device includes a spiral spring, and the spiral spring is disposed on an outer side of the first engagement portion in a sleeving manner.

In some embodiments of the present specification, the drive portion is a hydraulic drive portion. The hydraulic drive portion includes a follow-up portion. The follow-up portion may rotate with the drive pin or may be braked. A drive surface is disposed on the follow-up portion. When the follow-up portion is braked, the drive surface drives the drive pin to slide along the axial direction on the drive surface, so as to cause the second engagement portion to be engaged with the first engagement portion.

In some embodiments of the present specification, the hydraulic drive portion also includes a hydraulic brake portion. The hydraulic brake portion is configured to brake the follow-up portion.

In some embodiments of the present specification, the hydraulic brake portion is structured as a hydraulic brake caliper. One side of the follow-up portion is provided with a brake disc. The hydraulic brake caliper is used for braking the brake disc.

In some embodiments of the present specification, the hydraulic brake caliper includes a friction sheet for clamping the brake disc.

In some embodiments of the present specification, the drive surface is a slope or a curved surface.

In some embodiments of the present specification, the drive surface includes a first section and a second section. The first section is connected with the second section. A joint of the first section and the second section is the lowest point, and the other ends of the first section and the second section away from the joint are the highest points.

In some embodiments of the present specification, the follow-up portion includes a follow-up portion body and an annular follow-up portion flange disposed on the follow-up portion body. The drive surface is disposed on an end surface, facing the drive pins, of the follow-up portion flange.

In some embodiments of the present specification, a drive surface limiting slot is formed in the drive surface. One end of the drive pin is located in the drive surface limiting slot.

In some embodiments of the present specification, the first engagement portion has a plurality of first engagement teeth distributed along a circumferential direction, and the second engagement portion has a plurality of second engagement teeth distributed along the circumferential direction.

In some embodiments of the present specification, the drive pin attaches and fits with the second engagement portion.

The vehicle according to the present specification includes the differential mechanism disclosed in the present specification.

Figure 1:
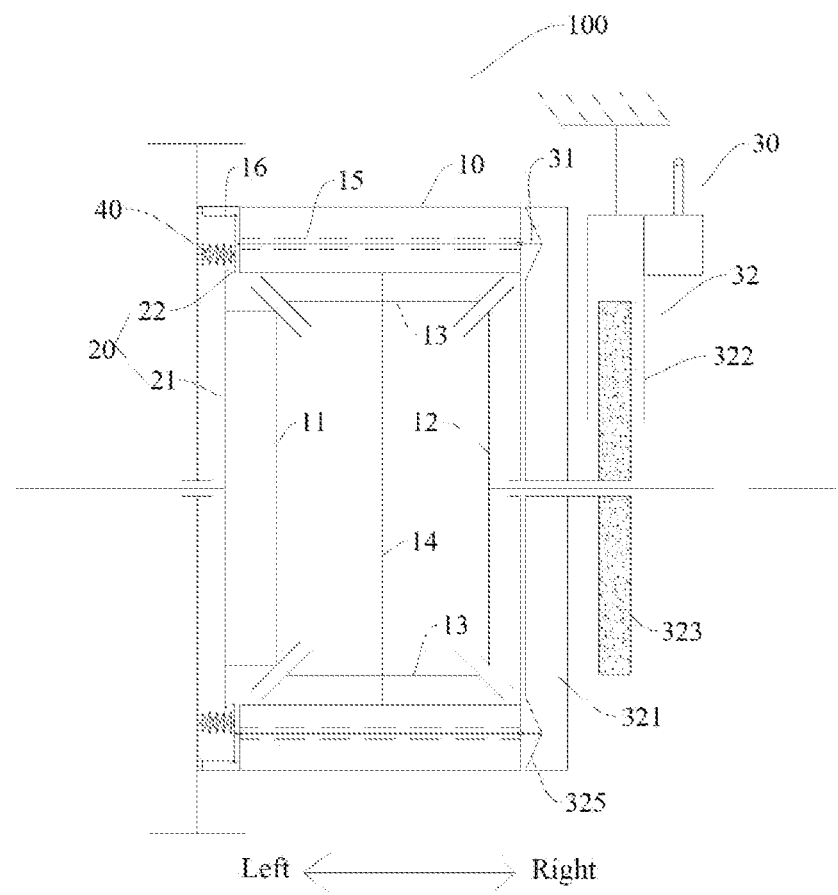
FIG. 1 is a schematic diagram of a differential mechanism according to an embodiment of the present specification.

Reference numerals of the accompanying drawing:
- 100: differential mechanism;
- 10: shell; 11: left half axle gear; 12: right half axle gear; 13: planet wheel; 14: planet wheel axle; 15: drive axle sliding chute; 16: shell axial slot;
- 20: power engagement device; 21: first engagement portion; 211: first connection tooth;
- 22: second engagement portion; 221: second engagement portion protrusion; 222: second connection tooth;
- 30: engagement portion drive device; 31: drive pin;
- 32: drive portion; 321: follow-up portion; 321a: follow-up portion body; 321b: follow-up portion flange;
- 322: hydraulic brake portion; 323: brake disc; 325: drive surface; 325a: first section;
- 325b: second section; 325c: drive surface limiting slot; and
- 40: elastic device.

DETAILED DESCRIPTION

The embodiments of the present specification are described in detail below. Examples of the embodiments are illustrated in the accompanying drawings. The following embodiments described with reference to the accompanying drawings are exemplary, and are intended to describe, but should not be construed as limitations to the present specification.

A differential mechanism 100 for a vehicle according to an embodiment of the present specification is described below in detail with reference to FIG. 1 to FIG. 5. The differential mechanism 100 may lock two half axles when the vehicle skids, thereby improving the mobility of the vehicle.

Figure 2:
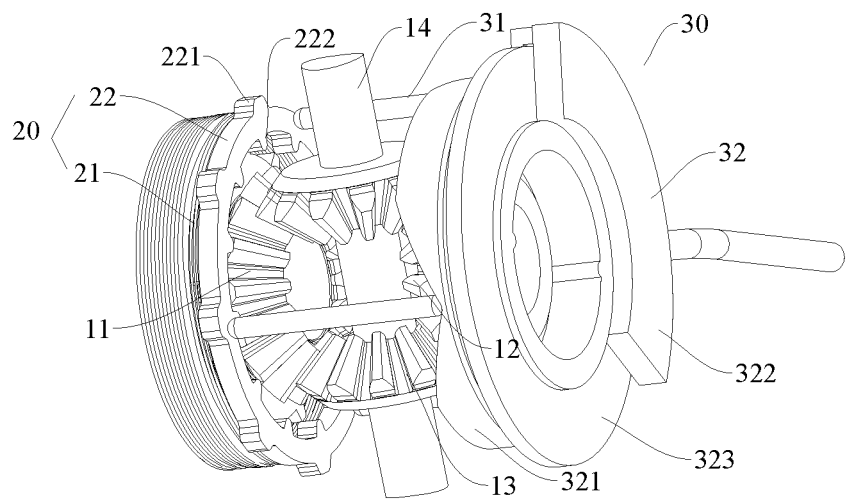
FIG. 2 is a structural schematic diagram of the differential mechanism without a shell.
Figure 3:
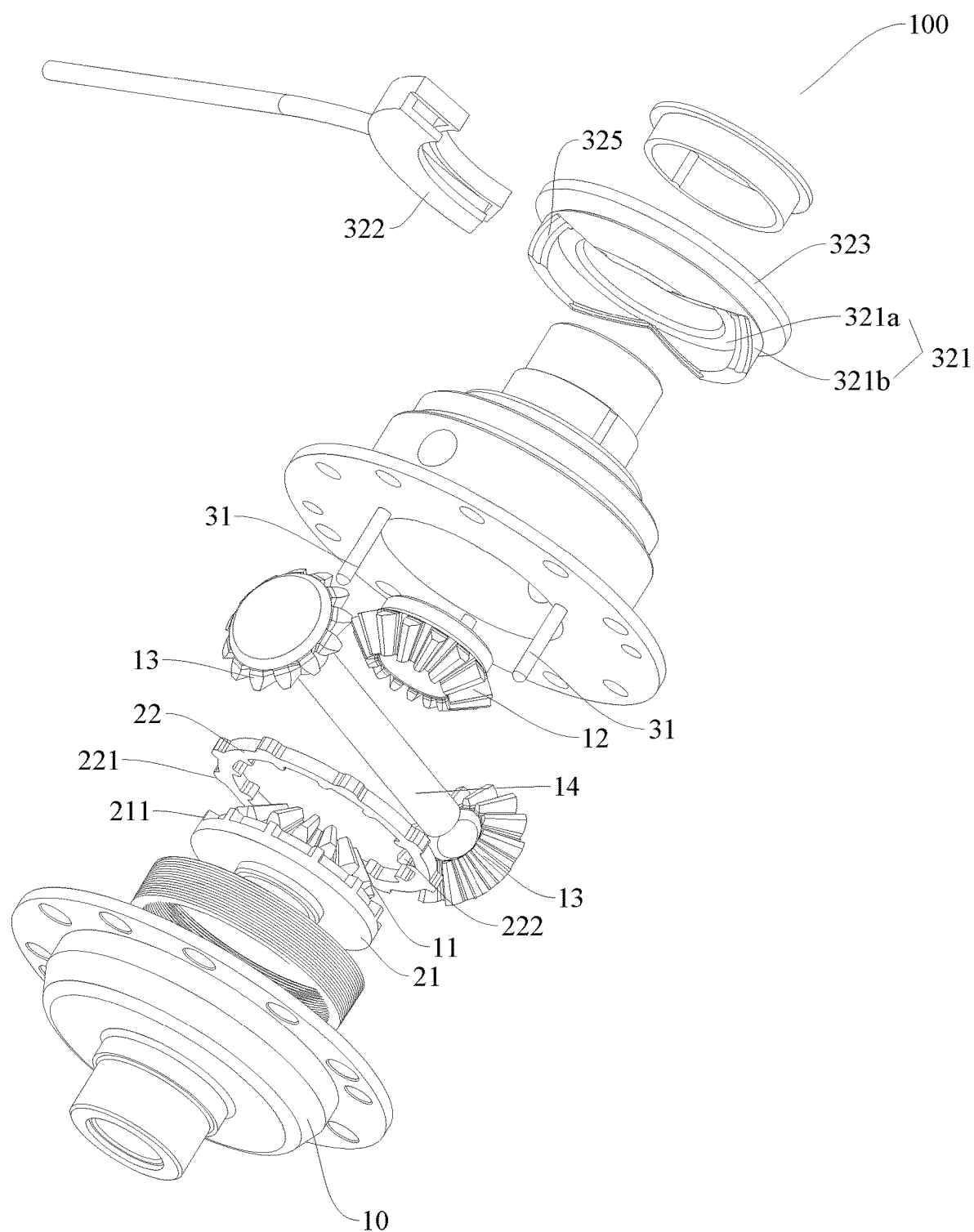
FIG. 3 is an exploded view of the differential mechanism according to an embodiment of the present specification.

As shown in FIG. 1, FIG. 2 and FIG. 3, the differential mechanism 100 according to the embodiments of the present specification may include a shell 10, a power engagement device 20, and an engagement portion drive device 30. The power engagement device 20 may be applied to the shell 10 and a half axle gear. The engagement portion drive device 30 may drive the power engagement device 20 to be engaged.

As shown in FIG. 1 to FIG. 3, a left half axle gear 11, a right half axle gear 12, planet wheels 13, and a planet wheel axle 14 may be disposed in the shell 10. The planet wheels 13 may be rotatably mounted on the planet wheel axle 14. The planet wheels 13 mesh with the left half axle gear 11 and the right half axle gear 12. The left half axle gear 11 is fixed on a left half axle, and the right half axle gear 12 is fixed on a right half axle, so that the differential mechanism 100 may output powers to the left half axle and the right half axle on both sides.

When the vehicle runs normally on a straight line, the planet wheels 13 revolve along with the planet wheel axle 14. The rotating speeds of the left half axle gear 11 and the right half axle gear 12 are the same, and the rotating speeds of a left wheel on the left half axle and a right wheel on the right half axle are the same.

When the vehicle turns normally (i.e., turns left) the planet wheels 13 revolve along with the planet wheel axle 14 and rotate around the planet wheel axle 14. The rotating speed of the left half axle gear 11 is decreased, and the rotating speed of the right half axle gear 12 is increased.

The power engagement device 20 includes a first engagement portion 21 and a second engagement portion 22. The first engagement portion 21 is connected with the left half axle gear 11 or the right half axle gear 12. The second engagement portion 22 may rotate synchronously with the shell 10 and move axially with respect to the shell 10. In this way, the second engagement portion 22 may be selectively engaged with the first engagement portion 21 by axial movement. When the second engagement portion 22 is engaged with the first engagement portion 21, half shaft gears and the shell 10 have the same rotating speed. At the moment, the locking of the two half axles may be realized to improve the mobility of the vehicle. The first engagement portion 21 is connected with the left half axle gear 11 or the right half axle gear 12 to realize corresponding functions of the differential mechanism 100. An example of an engagement between the first engagement portion 21 and the left half axle gear 11 may be described as follows.

The engagement portion drive device 30 may include drive pins 31 and a drive portion 32. The drive pins 31 are configured to rotate with the shell 10 and the move axially with respect to the shell 10. Two ends of the drive pins 31 are respectively matched with the drive portion 32 and the second engagement portion 22. The drive portion 32 is configured to drive the drive pins 31 to drive the second engagement portion 22 towards the first engagement portion 21 along an axial direction for engaging the second engagement portion 22 with the first engagement portion 21. That is, the drive portion 32 may drive the second engagement portion 22 to be engaged with the first engagement portion 21 by driving the drive pins 31 to move axially, thereby causing the shell 10 to be locked with the corresponding half axle gears. As a result, the two half axles are locked to improve the mobility of the vehicle.

A traditional electric locking differential mechanism is constructed by adding an electrical locking mechanism on the basis of a common open differential mechanism, so that the differential mechanism has a locking function and is locked through electrical control. This traditional electric locking differential mechanism generally is applied to a centralized fuel drive automobile. That is, power is distributed to left and right half axles after passing through a main speed reducer and the differential mechanism, and the differential mechanism adjusts a speed difference between the left and right wheels. However, since the traditional electric locking differential mechanism has a large size and an electric vehicle does not have an engine, this type of differential mechanism cannot be directly applied to the electric vehicle.

Therefore, the differential mechanism of the present specification is significantly different from the traditional electric locking differential mechanism both in structure and implementation. Furthermore, the locking of the left half axle and the right half axle may be realized by the power engagement device 20 and the engagement portion drive device 30, so that the differential mechanism 100 may have a simple structure, resulting in a reliable implementation, fewer parts, a small size, and a low cost.

In some embodiments, as shown in FIG. 1, a drive axle sliding chute 15 may be formed in the shell 10. The drive pins 31 are slidably disposed in the drive axle sliding chute 15. The drive axle sliding chute 15 may limit radial movements of the drive pins 31, and may guide the axial movements of the drive pins 31. Thus, the axial movements of the drive pins 31 may be more stable and reliable to improve the working reliability of the differential mechanism 100.

Further, as shown in FIG. 1, a shell axial slot 16 may also be formed in the shell 10. A second engagement portion protrusion 221 is disposed on the second engagement portion 22. The second engagement portion protrusion 221 is disposed in the shell axial slot 16 to cause the second engagement portion 22 to rotate with the shell 10 and may move axially with respect to the shell 10. Thus, by matching the shell axial slot 16 with the second engagement portion protrusion 221, the second engagement portion 22 may move in the axial direction relative to the shell 10 and may cause the shell 10 to drive the second engagement portion 22 to synchronously rotate in the circumferential direction to improve the working reliability of the differential mechanism 100.

According to an embodiment of the present specification, as shown in FIG. 1, the differential mechanism 100 may also include elastic devices 40. The elastic devices 40 elastically press against the second engagement portion 22 to cause the second engagement portion 22 to move away from the first engagement portion 21. It can be understood that the second engagement portion 22 needs to overcome the elastic force of the elastic devices 40 when moving close to the first engagement portion 21. The elastic devices 40 may drive the second engagement portion 22 to move away from the first engagement portion 21 when the second engagement portion 22 moves away from the first engagement portion 21. By repositioning and separating, the elastic devices 40 may allow the second engagement portion 22 to work repeatedly and reliably to improve the working reliability of the differential mechanism 100.

In some embodiments of the present specification, as shown in FIG. 1, one end of each of the elastic devices 40 elastically presses against the second engagement portion 22, and the other end of each of the elastic devices 40 elastically presses against the shell 10 to enable the elastic devices 40 work reliably and conveniently.

As shown in FIG. 1, the elastic devices 40 may include a spiral spring, and the spiral spring may be disposed on an side of the first engagement portion 21 or may sleeve on the first engagement portion 21. This arrangement may reasonably use the radial space of the differential mechanism 100 to improve the space utilization of the differential mechanism 100 for the miniaturization of the differential mechanism 100.

The drive portion 32 may include a hydraulic drive portion 32. The hydraulic drive portion 32 may include a follow-up portion 321. The follow-up portion 321 may rotate along with the drive pins 31, or the follow-up portion 321 may be braked. A drive surface 325 is disposed on the follow-up portion 321. When the follow-up portion 321 is braked, the drive pins 31 may slide on the drive surface 325 to change contact fitting positions between the drive pins 31 and the drive surface 325. The drive surface 325 can drive the drive pins 31 to move along the axial direction, and to engage the second engagement portion 22 with the first engagement portion 21. It can be understood that before the follow-up portion 321 is braked, the follow-up portion 321 and the drive pins 31 may synchronously rotate. But after the follow-up portion 321 is braked, the rotating speed of the follow-up portion 321 is decreased, such that the rotating speed of the follow-up portion 321 and the rotating speed of the drive pins 31 may be different. In this way, the drive pins 31 may slide on the drive surface 325 of the follow-up portion 321, and the drive pins 31 may move axially with respect to the shell 10, so that the drive pins 31 may drive the second engagement portion 22 to approach the first engagement portion 21 till engaged with the first engagement portion 21.

Figure 5:
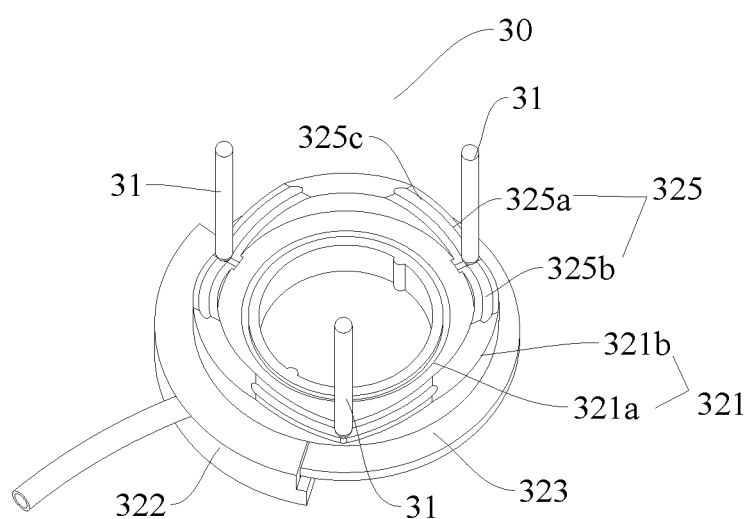
FIG. 5 is a structural schematic diagram of an engagement portion drive device.

Further, as shown in FIG. 2, FIG. 3 and FIG. 5, the hydraulic drive portion 32 may also include a hydraulic brake portion 322. The hydraulic brake portion 322 is configured to brake the follow-up portion 321, when the first engagement portion 21 and the second engagement portion 22 need to be engaged.

In some embodiments, the hydraulic brake portion 322 may be structured as a hydraulic brake caliper. One side of the follow-up portion 321 is provided with a brake disc 323, and the hydraulic brake caliper may brake the brake disc 323. That is, the hydraulic brake caliper may brake the follow-up portion 321 by braking the brake disc 323, to cause the rotating speed difference between the follow-up portion 321 and the drive pins 31. Therefore, the drive pins 31 may drive the second engagement portion 22 to be engaged with the first engagement portion 21.

Specifically, the hydraulic brake caliper may include a friction sheet for clamping the brake disc 323 to drive the friction sheet to contact the brake disc 323 by frictional braking, in a hydraulic manner.

According to an embodiment of the present specification, as shown in FIG. 5, the drive surface 325 may be a slope or a curved surface for sliding the drive pins 31 on the drive surface 325 to promote the drive pins 31 to move in the axial direction thereof.

Further, the drive surface 325 may include a first section 325a and a second section 325b connected with the first section 325a. A joint of the first section 325a and the second section 325b is the lowest point, and the other ends of the first section 325a and the second section 325b, away from the joint, are the highest points. Thus, when one end of each of the drive pins 31 is at the lowest point, the first engagement portion 21 and the second engagement portion 22 are separated. When one end of each of the drive pins 31 is at the highest points or adjacent to the highest points, the first engagement portion 21 and the second engagement portion 22 are engaged. In this way, by reasonably arranging the drive surface 325, the drive pins 31 may slide between the lowest point and the highest points to engage the first engagement portion 21 with the second engagement portion 22, and to improve the working reliability of a drive axle locking device.

In some embodiments of the present specification, each of the first section 325a and the second section 325b may be arc-shaped. The arc-shaped first section 325a and the arc-shaped second section 325b may make sliding of one end of each of the drive pins 31 on the drive surface 325 easier and may reduce moving resistance of the drive pins 31.

In some embodiments of the present specification, the center angles corresponding to each of the first section 325a and the second section 325b are equal. In this way, the first section 325a and the second section 325b are basically the identical for easy sliding the drive pins 31 on the drive surface 325.

In some embodiments of the present specification, a plurality of sections of drive surfaces 325 may be provided and are distributed along the circumferential direction in intervals. Thus, the number of the drive pins 31 may be increased to correspond to the increased number of the drive surfaces 325, for reliably fitting the plurality of drive pins 31 with the second engagement portion 22. The second engagement portion 22 may reliably move axially for the drive axle locking device to work more reliably.

The plurality of sections of drive surfaces 325 may be connected through a connection plane. The connection plane is flush with the highest points to improve the structural reliability of the drive surfaces 325 of the follow-up portion 321 and the structural reliability of the drive axle locking device.

According to an embodiment of the present specification, as shown in FIG. 5, the follow-up portion 321 may include a follow-up portion body 321a and an annular follow-up portion flange 321b disposed on the follow-up portion body 321a. The drive surface 325 is disposed on an end surface, facing the drive pins 31, of the follow-up portion flange 321b. In this way, the follow-up portion body 321a may effectively enhance the structural reliability of the follow-up portion 321. Furthermore, the drive surface 325 may be disposed on the end surface of the follow-up portion flange 321b to reduce the design difficulty of the drive surface 325, and to improve the structural reliability of the drive surface 325.

Further, as shown in FIG. 5, drive surface limiting slots 325c may be formed in the drive surface 325. One end of each of the drive pins 31 is located in each of the drive surface limiting slots 325c to prevent the one end of each of the drive pins 31 from leaving the drive surface 325 to improve the moving reliability and stability of the drive pins 31 in the drive surface 325.

Figure 4:
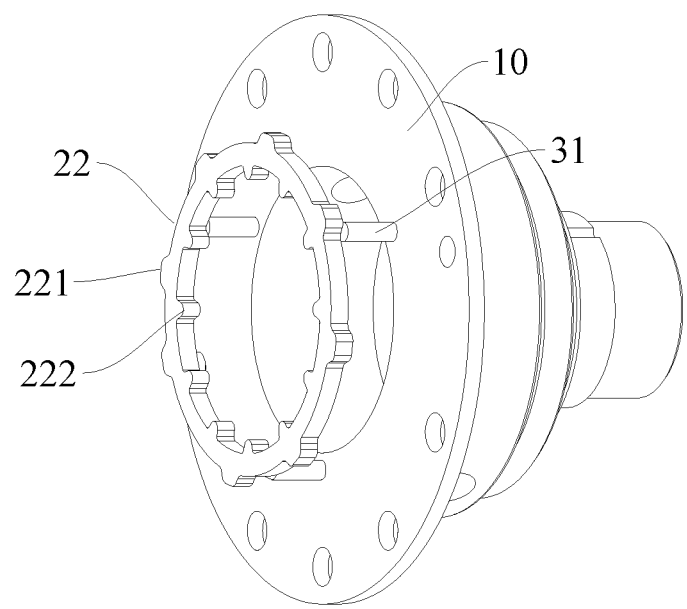
FIG. 4 is a schematic diagram of the shell and a second engagement portion.

According to an embodiment of the present specification, as shown in FIG. 2, FIG. 3, and FIG. 4, the first engagement portion 21 has a plurality of first engagement teeth 211 distributed along the circumferential direction, and the second engagement portion 22 has a plurality of second engagement teeth 222 distributed along the circumferential direction. It can be understood that when the first engagement teeth 211 and the second engagement teeth 222 are meshed, the first engagement portion 21 and the second engagement portion 22 are engaged. The engaging reliability of the first engagement portion 21 and the second engagement portion 22 may be improved by the plurality of first engagement teeth 211 and the plurality of second engagement teeth 222.

In some embodiments of the present specification, the drive pins 31 attach and fit with the second engagement portion 22. In this way, the drive pins 31 and the second engagement portion 22 may be matched reliably to improve the working reliability of the differential mechanism 100.

A working principle of the differential mechanism 100 according to the embodiments of the present specification is described below in detail.

When a vehicle gets stuck and skids, the hydraulic brake brakes the follow-up portion 321, so the rotating speed of the follow-up portion 321 is suppressed and the rotating speed of the drive pins 31 is different than the rotating speed of a brake component. The drive pins 31 may slide on the drive surface 325 of the brake component from the lowest point of the drive surface 325 to the highest points or to positions adjacent to the highest points. The drive pins 31 may move axially towards one side of the second engagement portion 22 to drive the second engagement portion 22 to approach the first engagement portion 21 till engaged with the second engagement portion 22. At this moment, the left half axle and the right half axle may rotate synchronously, thereby improving the mobility of the vehicle.

After the vehicle gets out of the stuck, the elastic devices 40 push the second engagement portion 22 to move axially away from the first engagement portion 21. The drive pins 31 move axially with the second engagement portion 22, and the ends of the drive pins 31 matched with the drive surface 325 may gradually slide from the highest points or the positions adjacent to the highest points to the lowest point. At this moment, the second engagement portion 22 and the first engagement portion 21 are completely separated, and the vehicle may continuously run at straight line or turn normally.

The vehicle according to an embodiment of the present specification may include the differential mechanism 100 described above.

In the descriptions of this specification, a description of a reference term such as "an embodiment", "some embodiments", "an example", "a specific example", or "some examples" means that a specific feature, structure, material, or characteristic described with reference to the embodiment or the example is included in at least one embodiment or example of the present specification. In this specification, schematic descriptions of the foregoing terms do not need to refer to a same embodiment or example. In addition, the described specific features, structures, materials, or characteristics may be combined in any proper manner in any embodiments or examples. In addition, a person skilled in the art may integrate or combine different embodiments or examples and characteristics of different embodiments or examples described in the specification, as long as they do not conflict with each other.

The above described embodiments of the present specification are exemplary, and shall not be construed as a limitation to the present specification. Within the scope of the present specification, changes, modifications, replacements, and variations of the foregoing embodiments may be made by a person of ordinary skill in the art and shall still be under the protection within the scope of the present specification.

What is claimed is:

1. A differential mechanism, comprising:
   a shell, wherein a left half axle gear, a right half axle gear, a planet wheel, and a planet wheel axle are disposed in the shell, the shell comprises a shell axial slot, the planet wheel is rotatably mounted on the planet wheel axle, and the planet wheel meshes with the left half axle gear and the right half axle gear respectively;
   a power engagement device comprising a first engagement portion and a second engagement portion, wherein the first engagement portion is connected with the left half axle gear or the right half axle gear, a second engagement portion protrusion is disposed on the second engagement portion and in the shell axial slot to cause the second engagement portion to rotate with the shell and to axially move with respect to the shell, and the second engagement portion rotates synchronously with the shell and moves axially with respect to the shell; and an engagement portion drive device comprising a drive pin and a drive portion, wherein the drive pin is configured to rotate with the shell and to axially move with respect to the shell, two ends of the drive pin are respectively matched with the drive portion and the second engagement portion, the drive portion is configured to drive the drive pin to drive the second engagement portion towards to the first engagement portion along an axial direction for engaging the second engagement portion with the first engagement portion.

2. The differential mechanism according to claim 1, wherein the shell comprises a drive axle sliding chute, and the drive pin is slidably disposed in the drive axle sliding chute.

3. The differential mechanism according to claim 1, further comprising: an elastic device, wherein the elastic device elastically presses against the second engagement portion to cause the second engagement portion to move away from the first engagement portion.

4. The differential mechanism according to claim 3, wherein one end of the elastic device elastically presses against the second engagement portion, and the other end of the elastic device elastically presses against the shell.

5. The differential mechanism according to claim 3, wherein the elastic device includes a spiral spring, and the spiral spring is disposed on an outer side of the first engagement portion in a sleeving manner.

6. A differential mechanism, comprising:
a shell, wherein a left half axle gear, a right half axle gear, a planet wheel, and a planet wheel axle are disposed in the shell, the planet wheel is rotatably mounted on the planet wheel axle, and the planet wheel meshes with the left half axle gear and the right half axle gear respectively;
a power engagement device comprising a first engagement portion and a second engagement portion, wherein the first engagement portion is connected with the left half axle gear or the right half axle gear; and
an engagement portion drive device comprising a drive pin and a drive portion, wherein the drive pin is configured to rotate with the shell and to axially move with respect to the shell, two ends of the drive pin are respectively matched with the drive portion and the second engagement portion, the drive portion is configured to drive the drive pin to drive the second engagement portion towards to the first engagement portion along an axial direction for engaging the second engagement portion with the first engagement portion, wherein the drive portion includes a hydraulic drive portion, and the hydraulic drive portion comprises:
a follow-up portion and a hydraulic brake portion, wherein the follow-up portion rotates with the drive pin, and a drive surface is disposed on the follow-up portion,
wherein when the follow-up portion is braked by the hydraulic brake portion, the drive surface drives the drive pin to slide along the axial direction on the drive surface for engaging the second engagement portion with the first engagement portion.

7. The differential mechanism according to claim 6, wherein the hydraulic brake portion comprises a hydraulic brake caliper; and one side of the follow-up portion has a brake disc, and the hydraulic brake caliper is configured to brake the brake disc.

8. The differential mechanism according to claim 7, wherein the hydraulic brake caliper comprises a friction sheet for clamping the brake disc.

9. The differential mechanism according to claim 6, wherein the drive surface includes a slope or a curved surface.

10. The differential mechanism according to claim 6, wherein the drive surface comprises a first section and a second section, the first section is connected with the second section, a joint of the first section and the second section is a lowest point, and the other ends of the first section and the second section opposite to the joint are highest points.

11. The differential mechanism according to claim 10, wherein the follow-up portion comprises a follow-up portion body and an annular follow-up portion flange disposed on the follow-up portion body, and the drive surface is disposed on an end surface, facing the drive pin, of the follow-up portion flange.

12. The differential mechanism according to claim 6, wherein a drive surface limiting slot is disposed on the drive surface, and one end of the drive pin is located in the drive surface limiting slot.

13. The differential mechanism according to claim 1, wherein the first engagement portion has a plurality of first engagement teeth distributed along a circumferential direction, and the second engagement portion has a plurality of second engagement teeth distributed along the circumferential direction.

14. The differential mechanism according to claim 1, wherein the drive pin attaches and fits with the second engagement portion.

15. A vehicle, comprising a differential mechanism, wherein the differential mechanism comprises:
a shell, wherein a left half axle gear, a right half axle gear, a planet wheel, and a planet wheel axle are disposed in the shell, the shell comprises a shell axial slot, the planet wheel is rotatably mounted on the planet wheel axle, and the planet wheel meshes with the left half axle gear and the right half axle gear respectively;
a power engagement device comprising a first engagement portion and a second engagement portion, wherein the first engagement portion is connected with the left half axle gear or the right half axle gear, a second engagement portion protrusion is disposed on the second engagement portion and in the shell axial slot to cause the second engagement portion to rotate with the shell and to axially move with respect to the shell, and the second engagement portion rotates synchronously with the shell and moves axially with respect to the shell; and
an engagement portion drive device comprising a drive pin and a drive portion, wherein the drive pin is configured to rotate with the shell and to axially move with respect to the shell, two ends of the drive pin are respectively matched with the drive portion and the second engagement portion, the drive portion is configured to drive the drive pin to drive the second engagement portion towards to the first engagement portion along an axial direction for engaging the second engagement portion with the first engagement portion.

* * * * *